United States Patent
Kaneda

(10) Patent No.: US 9,148,247 B2
(45) Date of Patent: Sep. 29, 2015

(54) FREQUENCY-DIVERSITY MIMO PROCESSING FOR OPTICAL TRANSMISSION

(71) Applicant: Noriaki Kaneda, Westfield, NJ (US)

(72) Inventor: Noriaki Kaneda, Westfield, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 109 days.

(21) Appl. No.: 14/032,419

(22) Filed: Sep. 20, 2013

(65) Prior Publication Data

US 2015/0086204 A1   Mar. 26, 2015

(51) Int. Cl.
*H04B 10/00* (2013.01)
*H04J 14/02* (2006.01)
*H04J 14/06* (2006.01)
*H04B 10/61* (2013.01)

(52) U.S. Cl.
CPC ............. *H04J 14/0298* (2013.01); *H04B 10/61* (2013.01); *H04J 14/06* (2013.01)

(58) Field of Classification Search
CPC ....... H04J 14/0298; H04J 14/06; H04B 10/61
See application file for complete search history.

(56) References Cited

U.S. PATENT DOCUMENTS 5,134,509 A * 7/1992 Olshansky et al. ............. 398/76
5,440,415 A * 8/1995 Mekawi et al. ................. 398/76
5,546,190 A * 8/1996 Hill et al. ........................ 398/76
6,535,289 B1 * 3/2003 Baney et al. ................... 356/484
6,646,746 B1 * 11/2003 Sorin et al. .................... 356/451
6,993,311 B2 * 1/2006 Li et al. .......................... 455/307
7,162,165 B2 * 1/2007 Szafraniec .................... 398/202

(Continued)

FOREIGN PATENT DOCUMENTS

EP        0637880 A1    2/1995

OTHER PUBLICATIONS

Ingham, J. D., et al, "100 Gb/s Uncooled WDM System Using Conventional WDM Components and Advanced Receiver Signal Processing," European Conference and Exhibition on Optical Communication, ECOC Technical Digest, 2012, OSA (3 pages).

(Continued)

*Primary Examiner* — Danny Leung
(74) *Attorney, Agent, or Firm* — Mendelsohn, Drucker & Dunleavy, P.C.; Yuri Gruzdkov

(57) ABSTRACT

An optical transport system configured to transmit information using two or more modulated optical carriers spaced at spectral intervals that are smaller than the baud rate. An example optical receiver in the optical transport system includes a signal equalizer configured to implement frequency-diversity multiple-input/multiple-output signal processing directed at canceling the effects of inter-carrier interference caused by the spectral overlap between adjacent modulated optical carriers to enable the optical receiver to recover individual data streams encoded onto the different modulated optical carriers at the corresponding optical transmitter(s). Some embodiments of the optical transport system may advantageously be capable of achieving a higher spectral efficiency than the spectral efficiency supported by the optical orthogonal-frequency-division-multiplexing transmission format.

22 Claims, 10 Drawing Sheets

(56) References Cited

U.S. PATENT DOCUMENTS

| | | | |
|---|---|---|---|
| 7,260,370 B2* | 8/2007 | Wang et al. | 455/135 |
| 8,019,029 B1* | 9/2011 | Katic | 375/346 |
| 8,335,440 B2* | 12/2012 | Krause et al. | 398/208 |
| 2002/0024693 A1* | 2/2002 | Manor et al. | 359/124 |
| 2011/0069975 A1 | 3/2011 | Liu et al. | |
| 2012/0121002 A1* | 5/2012 | Liu et al. | 375/227 |
| 2013/0071119 A1* | 3/2013 | Liu et al. | 398/65 |
| 2013/0236195 A1 | 9/2013 | Ryf | |
| 2013/0243430 A1 | 9/2013 | Hironishi et al. | |

OTHER PUBLICATIONS

Pan, Jie, et al., "Inter-Channel Crosstalk Cancellation for Nyquist-WDM Superchannel Applications," Journal of Lightwave Technology, vol. 30, No. 24, Dec. 15, 2012, pp. 3993-3999.

Treichler, John K., et al., "A New Approach to Multipath Correction of Constant Modulus Signals," IEEE Transactions on Acoustics, Speech, and Signal Processing, vol. ASSP-31, No. 2, Apr. 1983, pp. 459-472.

International Search Report and Written Opinion; Mailed Feb. 25, 2015 for corresponding PCT Application No. PCT/US2014/055773.

* cited by examiner

100

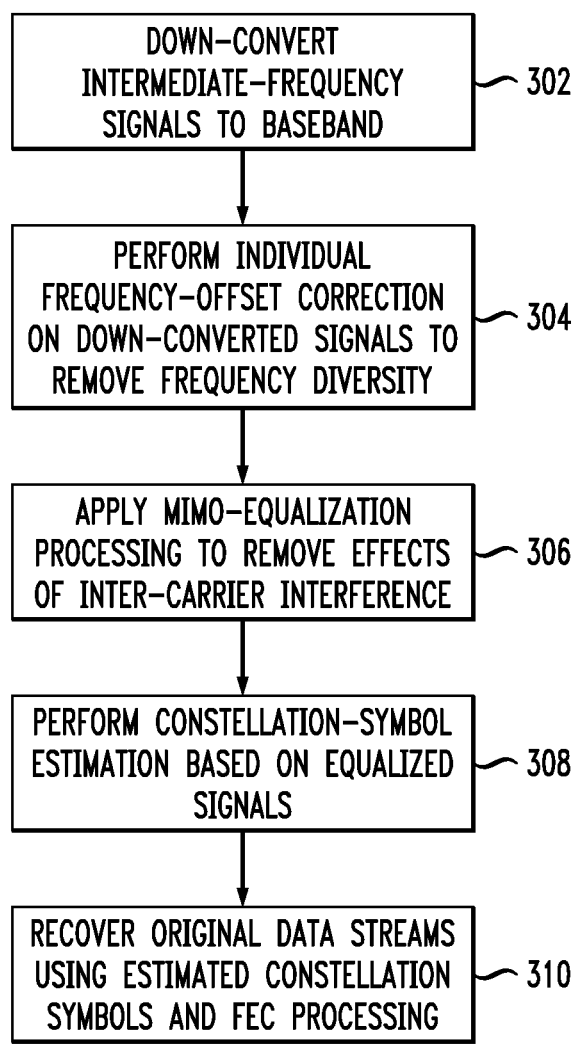

600

700

FREQUENCY-DIVERSITY MIMO PROCESSING FOR OPTICAL TRANSMISSION

BACKGROUND

1. Field

The present invention relates to optical communication equipment and, more specifically but not exclusively, to an optical transmission scheme using frequency-diversity (FD) multiple-input/multiple-output (MIMO) signal processing.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Telecommunications companies face continuing demands for increased capacity in their metro, regional, and long-haul optical networks, e.g., due to the proliferation of high-speed data services, video services, and business and residential broadband connections. While optical fiber has a very large intrinsic capacity for transporting data, the spectral efficiency realized in modern optical networks still has significant room for improvement. For example, one of the most spectrally efficient optical-transport techniques employed today is optical orthogonal frequency-division multiplexing (OFDM), which uses modulated subcarriers that are spaced exactly at the baud rate. However, a higher spectral efficiency than that supported by optical OFDM is likely to be required to meet the capacity demands in the future.

In telecommunications and electronics, the term "baud rate" refers to the data rate expressed in the units of symbols per second or pulses per second. Baud rate, also sometimes referred to as "modulation rate," is therefore the number of distinct symbol changes or signaling events applied to the transmission medium per second using a digitally modulated signal or line code. The corresponding bit rate is a product of the baud rate and the number of bits per symbol in the employed modulation format or constellation.

SUMMARY OF SOME SPECIFIC EMBODIMENTS

Disclosed herein are various embodiments of an optical transport system configured to transmit information using two or more modulated optical carriers spaced at spectral intervals that are smaller than the baud rate. An example optical receiver in the disclosed optical transport system includes a signal equalizer configured to implement FD-MIMO signal processing directed at canceling the effects of inter-carrier interference caused by the spectral overlap between adjacent modulated optical carriers to enable the optical receiver to recover individual data streams encoded onto the different modulated optical carriers at the corresponding optical transmitter(s). Advantageously, some embodiments of the optical transport system may be capable of achieving a higher spectral efficiency than the spectral efficiency supported by the optical OFDM transmission format.

In some embodiments, the disclosed optical transport system may be configured to transmit polarization-division-multiplexed optical signals.

According to one embodiment, provided is an optical receiver comprising an optical detector configured to generate a first filtered electrical signal and a second filtered electrical signal based on a received modulated optical signal, wherein the received modulated optical signal has (i) a first modulated optical carrier having encoded thereon a first data stream at a selected baud rate, said first modulated optical carrier having a first carrier frequency, and (ii) a second modulated optical carrier having encoded thereon a second data stream at the selected baud rate, said second modulated optical carrier having a second carrier frequency, wherein the first and second carrier frequencies are separated from one another by a frequency interval that is smaller than the selected baud rate. The optical receiver further comprises a signal processor configured to process the first and second filtered electrical signals to recover the first data stream and the second data stream.

According to another embodiment, provided is an apparatus comprising: a first optical transmitter configured to generate a first modulated optical carrier having encoded thereon a first data stream at a selected baud rate, said first modulated optical carrier having a first carrier frequency; a second optical transmitter configured to generate a second modulated optical carrier having encoded thereon a second data stream at the selected baud rate, said second modulated optical carrier having a second carrier frequency, wherein the first and second carrier frequencies are separated from one another by a frequency interval that is smaller than the selected baud rate; and an optical combiner configured to combine the first modulated optical carrier and the second modulated optical carrier for transmission over a fiber-optic link.

According to yet another embodiment, provided is an optical transmitter comprising: a plurality of electrical intermediate-frequency generators, each configured to generate a respective electrical carrier wave having a respective intermediate frequency, wherein spacing between neighboring intermediate frequencies is smaller than a selected baud rate; a plurality of electrical modulators, each configured to modulate the respective electrical carrier wave, at the selected baud rate and using a respective one of a plurality of data streams to generate a respective one of a plurality of modulated electrical carriers; an electrical signal combiner configured to combine the plurality of modulated electrical carriers to generate a modulated multi-carrier electrical signal; and an optical modulator configured to generate a modulated optical signal by modulating an optical carrier wave based on the modulated multi-carrier electrical signal.

According to yet another embodiment, provided is an optical receiver comprising: an optical detector configured to generate a first filtered electrical signal and a second filtered electrical signal based on a received modulated optical signal, wherein the received modulated optical signal has (i) a first modulated optical carrier having encoded thereon a first data stream at a selected baud rate, said first modulated optical carrier having a first carrier frequency, and (ii) a second modulated optical carrier having encoded thereon a second data stream at the selected baud rate, said second modulated optical carrier having a second carrier frequency; and a signal processor configured to: convert the first filtered electrical signal into a first electrical baseband signal; convert the second filtered electrical signal into a second electrical baseband signal; apply MIMO equalization processing to the first and second electrical baseband signals to mitigate an effect of inter-carrier interference due to partial spectral overlap of the first modulated optical carrier and the second modulated optical carrier, said MIMO equalization processing configured to receive, as a first input, the first electrical baseband signal, and further configured to receive, as a second input, the second electrical baseband signal, wherein said MIMO equalization processing is configured to generate a first equalized electrical signal, as a first output thereof, and a second equalized electrical signal, as a second output thereof; recover the first data stream based on the first equalized electrical signal; and recover the second data stream based on the second equalized electrical signal.

BRIEF DESCRIPTION OF THE DRAWINGS

Other aspects, features, and benefits of various embodiments of the invention will become more fully apparent, by way of example, from the following detailed description and the accompanying drawings, in which:

FIG. 3 shows a flowchart of a signal processing method that can be used in the optical transport system of FIG. 1 according to an embodiment of the disclosure;

DETAILED DESCRIPTION

Figure 1:
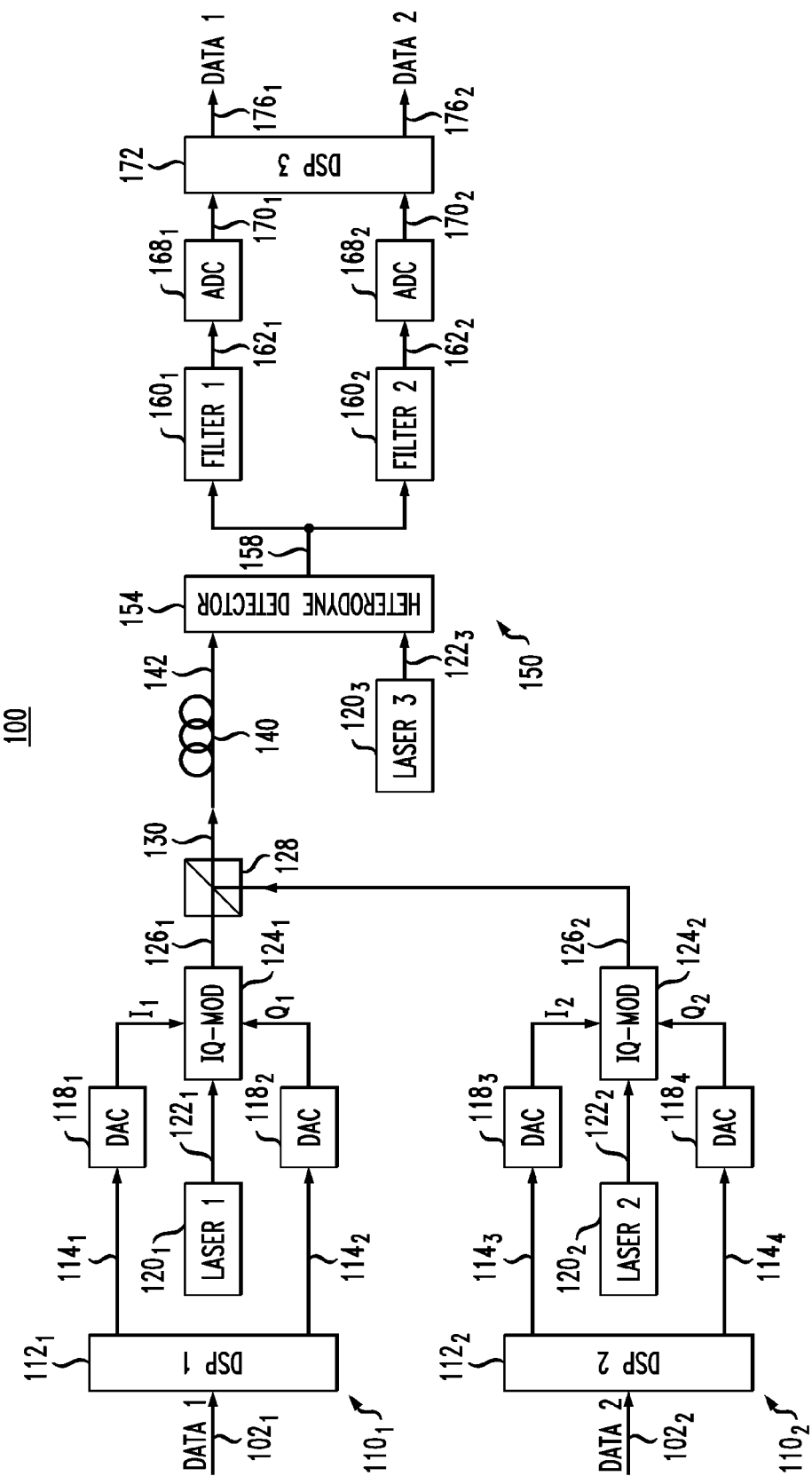
FIG. 1 shows a block diagram of an optical transport system according to an embodiment of the disclosure.

FIG. 1 shows a block diagram of an optical transport system 100 according to an embodiment of the disclosure. Optical transport system 100 is configured to use frequency-diversity multiple-input/multiple-output (FD-MIMO) signal processing, e.g., as further explained below. Briefly, optical transport system 100 is configured to transport (at least) two modulated optical carriers having encoded thereon (at least) two data streams, data1 and data2, respectively. Said modulated optical carriers are transmitted in parallel over a fiber-optic link 140, where they overlap in time and space, and are then processed at the egress end of the fiber-optic link, e.g., as further described below, to recover data streams data1 and data2.

The relationship between the carrier frequencies of the two modulated optical carriers used in optical transport system 100 is described by Eq. (1):

$$|f_1 - f_2| < R \quad (1)$$

where $f_1$ and $f_2$ are the first and second carrier frequencies, respectively; and R is the baud rate. In one embodiment, $|f_1-f_2|/R$ is smaller than about 0.9 but greater than about 0.2. In an alternative embodiment, $|f_1-f_2|/R$ is smaller than about 0.7 but greater than about 0.4. In yet another alternative embodiment, $|f_1-f_2|/R \approx 0.6$. In an example embodiment, the values of $f_1$ and $f_2$ are on the order of 200 THz, and the value of R is on the order of 10÷100 GHz (but is typically given using the units of Gbaud).

Optical transport system 100 has two optical transmitters (labeled $110_1$ and $110_2$) coupled to the ingress end of fiber-optic link 140 as indicated in FIG. 1. Optical transmitter $110_1$ is configured to receive data stream data1 via an electrical input port $102_1$. Optical transmitter $110_2$ is similarly configured to receive data stream data2 via an electrical input port $102_2$.

Optical transmitter $110_1$ applies data stream data1 to a digital signal processor (DSP) $112_1$. DSP $112_1$ processes data stream data1 to generate electrical digital signals $114_1$ and $114_2$. Such processing may include, but is not limited to forward-error-correction (FEC) encoding, constellation mapping, electronic dispersion pre-compensation, and pulse shaping, e.g., implemented as known in the art. The constellation used in the step of constellation mapping can be, e.g., a quadrature-amplitude-modulation (QAM) constellation or a quadrature-phase-shift-keying (QPSK) constellation.

In each signaling interval (also referred to as a symbol period or a time slot corresponding to an optical symbol), signals $114_1$ and $114_2$ carry digital values that represent the in-phase (I) component and quadrature (Q) component, respectively, of a corresponding constellation point (symbol) selected based on the respective portion of data from data stream data1. Digital-to-analog converters (DACs) $118_1$ and $118_2$ transform digital signals $114_1$ and $114_2$ into an analog form to generate electrical drive signals $I_1$ and $Q_1$, respectively. Drive signals $I_1$ and $Q_1$ are then used, in a conventional manner, to drive an optical I-Q modulator $124_1$. Based on drive signals $I_1$ and $Q_1$, optical I-Q modulator $124_1$ modulates a light beam $122_1$ supplied by a laser source $120_1$ to generate a modulated optical signal $126_1$. Light beam $122_1$ has carrier frequency $f_1$, and modulated optical signal $126_1$ is therefore the first of the above-mentioned two modulated optical carriers.

Optical transmitter $110_2$ is generally analogous to optical transmitter $110_1$ and is configured to apply similar (to the above-described) processing to data stream data2 to generate a modulated optical signal $126_2$. More specifically, the elements of optical transmitters $110_2$ and $110_1$ designated using similar alphanumerical labels have similar functions, and the description of those functions is not repeated here in reference to optical transmitter $110_2$. However, one difference between optical transmitters $110_1$ and $110_2$ is that a light beam $122_2$ generated by a laser source $120_2$ in optical transmitter $110_2$ has carrier frequency $f_2$. Modulated optical signal $126_2$ is therefore the second of the above-mentioned two modulated optical carriers.

A beam combiner 128 combines modulated optical signals $126_1$ and $126_2$ to generate an optical output signal 130, which is then applied to the ingress end of fiber-optic link 140 and transported therethrough to the egress end thereof, where it emerges as an optical signal 142. Optical signal 142 has the same two modulated optical carriers as optical signal 130, but is additionally affected by noise and various linear and non-linear distortions and impairments imposed in fiber-optic link 140.

Optical transport system 100 further has an optical receiver 150 coupled to the egress end of fiber-optic link 140 as indicated in FIG. 1. Optical receiver 150 comprises an optical heterodyne detector 154 configured to convert optical signal 142 into an intermediate-frequency electrical signal 158 using a local-oscillator signal $122_3$ generated by a laser source $120_3$. In one embodiment, local-oscillator signal $122_3$ has an optical frequency $f_3$ that has the following relationship with carrier frequencies $f_1$ and $f_2$:

$$|f_3 - 0.5 \times |f_1 - f_2|| \geq 2R \quad (2)$$

where R is the baud rate. Example optical heterodyne detectors that can be used as optical heterodyne detector 154 are disclosed, e.g., in U.S. Pat. Nos. 6,535,289, 6,646,746, and 7,162,165, all of which are incorporated herein by reference in their entirety.

Figure 2A:
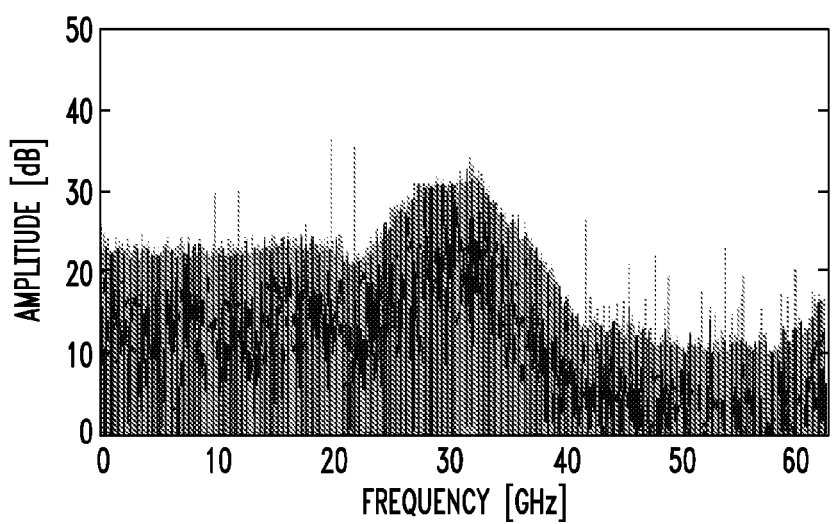
FIGS. 2A-2C graphically show spectra of intermediate-frequency signals generated in the optical transport system of FIG. 1 according to an embodiment of the disclosure.
Figure 2B:
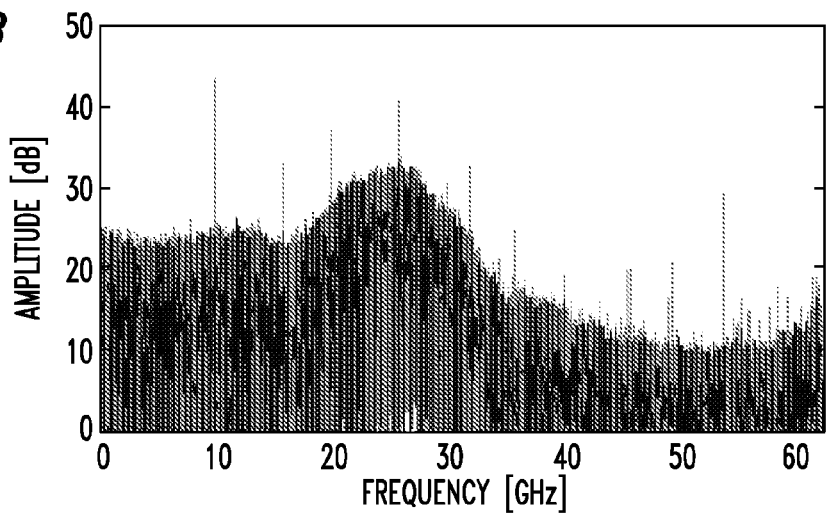
Figure 2C:
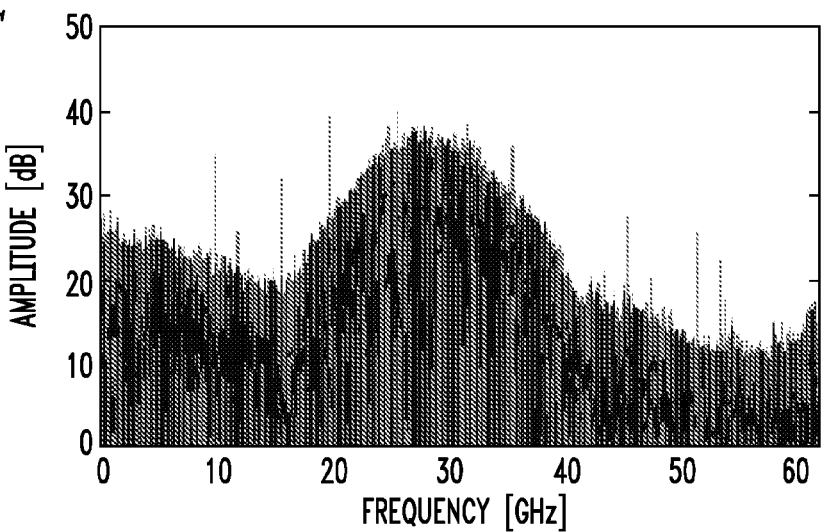

FIGS. 2A-2C graphically show spectra of intermediate-frequency electrical signal 158 (FIG. 1) according to an embodiment of the disclosure. More specifically, FIG. 2A shows a spectrum of intermediate-frequency signal 158 when only optical transmitter $110_1$ is transmitting, and optical transmitter $110_2$ is turned OFF. FIG. 2B shows a spectrum of intermediate-frequency signal 158 when only optical transmitter $110_2$ is transmitting, and optical transmitter $110_1$ is turned OFF. FIG. 2C shows a spectrum of intermediate-frequency signal 158 when both optical transmitters $110_1$ and $110_2$ are transmitting. The measurements presented in FIGS. 2A-2C correspond to the following configuration of optical transport system 100:

QPSK modulation at R=10 Gbaud;
$|f_1-f_2| \approx 6$ GHz; and
$|f_3-0.5 \times |f_1-f_2|| \approx 28$ GHz.

Referring back to FIG. 1, optical receiver 150 further comprises band-pass filters $160_1$ and $160_2$, each configured to receive a respective copy of intermediate-frequency electrical signal 158. Band-pass filter $160_1$ filters the received copy of intermediate-frequency signal 158 to generate a filtered electrical signal $162_1$. Band-pass filter $160_2$ similarly filters the received copy of intermediate-frequency signal 158 to generate a filtered electrical signal $162_2$.

In an example embodiment, band-pass filters $160_1$ and $160_2$ have different respective pass bands. For example, band-pass filter $160_1$ may be configured to pass a spectral band that is approximately centered at intermediate frequency $f_{IF1}=|f_3-f_1|$ and has a 3-dB width of about R. Band-pass filter $160_2$ may similarly be configured to pass a spectral band that is approximately centered at intermediate frequency $f_{IF2}=|f_3-f_2|$ and has a 3-dB width of about R.

In one embodiment, band-pass filters $160_1$ and $160_2$ may have transfer functions $F_1(f)$ and $F_2(f)$, respectively, that are described by Eqs. (3a)-(3b):

$$F_1(f) = F_0(f - f_{IF1}) \quad (3a)$$

$$F_2(f) = F_0(f - f_{IF2}) \quad (3b)$$

where f is frequency, and $F_0(f)$ is a transfer function that has a maximum at the zero frequency and is approximately symmetrical with respect to the zero frequency.

Analog-to-digital converters (ADCs) $168_1$ and $168_2$ convert filtered electrical signals $162_2$ and $162_2$ into digital form and apply the resulting digital electrical signals $170_1$ and $170_2$ to a DSP 172 for processing. DSP 172 processes digital electrical signals $170_1$ and $170_2$ using an FD-MIMO signal-processing method, an example embodiment of which is described below in reference to FIG. 3. Based on said processing, DSP 172 recovers data streams data1 and data2 and directs the recovered data stream to external circuits via electrical output ports $176_1$ and $176_2$, respectively.

FIG. 3 shows a flowchart of a signal processing method that can be used in DSP 172 (FIG. 1) according to an embodiment of the disclosure.

At step 302, DSP 172 performs down-conversion of digital electrical signals $170_1$ and $170_2$ to baseband. Recall that digital electrical signals $170_1$ and $170_2$ are digital forms of filtered electrical signals $162_1$ and $162_2$, which are intermediate-frequency signals. In the digital domain, frequency down-conversion can be implemented, e.g., by converting digital electrical signals $170_1$ and $170_2$ into a complex-valued form and then multiplying the corresponding complex values by the factor of $\exp[-j\pi(f_{IF1}+f_{IF2})t]$, where t is time. In this manner, the spectral bands corresponding to the two modulated optical carriers received by optical transmitter 150 via fiber-optic link 140 (see FIG. 1) are shifted down in frequency to symmetrical positions with respect to the zero frequency. For example, $f_{IF1}>f_{IF2}$, then the down-converted complex-valued digital signal derived from digital electrical signal $170_1$ is spectrally located at positive frequencies, and the down-converted complex-valued digital signal derived from digital electrical signal $170_2$ is spectrally located at negative frequencies.

At step 304, DSP 172 performs individual frequency-offset correction for each of the two down-converted complex-valued digital signals generated at step 302. More specifically, the down-converted complex-valued digital signal having positive frequencies is multiplied by the factor of $\exp[-j\pi|f_{IF1}-f_{IF2}|t]$. The down-converted complex-valued digital signal having negative frequencies is similarly multiplied by the factor of $\exp[j\pi|f_{IF1}-f_{IF2}|t]$. Step 304 can qualitatively be interpreted as a step of removing the carrier-frequency diversity of the two detected baseband signals.

At step 306, DSP 172 applies MIMO-equalization processing to mitigate the effects of inter-carrier interference present in the signals generated at step 306. Such effects are present due to the spectral overlap of the intermediate-frequency bands, which is illustrated, e.g., by the spectra shown in FIGS. 2A and 2B. That spectral overlap, in turn, is a consequence of the carrier-frequency relationship expressed by Eq. (1) and a similar spectral overlap of modulated optical signals $126_2$ and $126_2$.

The MIMO-equalization processing of step 306 can qualitatively be viewed as being directed at solving, e.g., approximately, the following mathematical problem. Suppose that the digital baseband signals corresponding to modulated optical signals $126_2$ and $126_2$ are $X_1(f)$ and $X_2(f)$, respectively. Let us denote as $Y_1(f)$ and $Y_2(f)$ the two digital baseband signals generated at step 304. The MIMO-equalization processing implemented in DSP 172 then needs to recover $(X_1(f), X_2(f))$ based on $(Y_1(f), Y_2(f))$.

The relationship between $(X_1(f), X_2(f))$ and $(Y_1(f), Y_2(f))$ can be understood by tracing the signal propagation and processing implemented in optical transport system 100. In one embodiment, this relationship can be expressed, for example, as follows:

$$\begin{pmatrix} Y_1(f) \\ Y_2(f) \end{pmatrix} = \begin{pmatrix} aF_0(f) & bF_0\left(f - \frac{|f_{IF1} - f_{IF2}|}{2}\right) \\ aF_0\left(f + \frac{|f_{IF1} - f_{IF2}|}{2}\right) & bF_0(f) \end{pmatrix} \begin{pmatrix} X_1(f) \\ X_2(f) \end{pmatrix} \quad (4)$$

where a and b are the complex numbers that describe the propagation of the first and second modulated carriers, respectively, through fiber-optic link 140 (FIG. 1); and $F_0(f)$ is the filter transfer function already introduced and described above in reference to Eqs. (3a)-(3b). Thus, to find $(X_1(f), X_2(f))$, DSP 172 needs to find the inverse of the 2×2 matrix that appears in Eq. (4). If we denote said inverse matrix as $H^{-1}(f)$, then the original baseband signals can be calculated using Eq. (5) as follows:

$$\begin{pmatrix} X_1(f) \\ X_2(f) \end{pmatrix} = H^{-1}(f) \begin{pmatrix} Y_1(f) \\ Y_2(f) \end{pmatrix} \quad (5)$$

Note that Eqs. (4) and (5) describe the MIMO-equalization processing in the frequency domain. Equivalently, this processing can also be implemented in the time domain, e.g., using one or more multi-tap finite-impulse-response (FIR) filters. Once the equations for time-domain equalization are formulated, a properly constructed cost or error function can be used to drive a suitable (e.g., a least-mean squares, LMS, or a constant-modulus, CMA) algorithm for properly configuring the FIR filters for blind MIMO equalization. An example of the error function that can be used for this purpose is described below in reference to FIG. 6. Example CMA implementations that can be used in the MIMO-equalization processing of step 306 are disclosed, e.g., in U.S. Pat. Nos. 8,335,440, 7,260,370, and 6,993,311, all of which are incorporated herein by reference by their entirety.

At step 308, the equalized digital signals generated at step 306 are used to estimate the corresponding original constellation symbols generated by DSPs 112$_1$ and 112$_2$ during the step of constellation mapping.

At step 310, the estimated constellation symbols generated at step 308 are converted, using the operative constellation, into the corresponding data streams, and said data streams are subjected to FEC decoding to remove possible errors and recover data streams data1 and data2.

Figure 4:
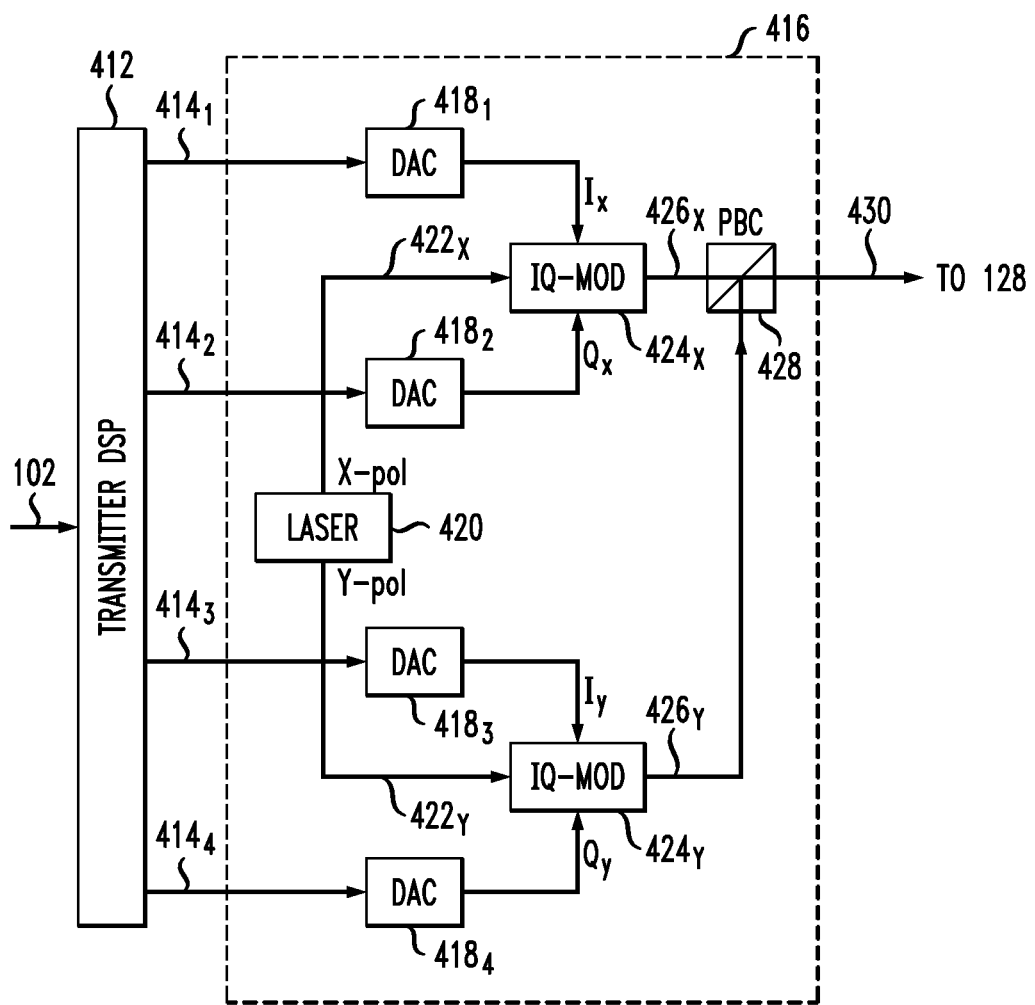
FIG. 4 shows a block diagram of an optical transmitter that can be used in the optical transport system of FIG. 1 according to an embodiment of the disclosure.
Figure 5:
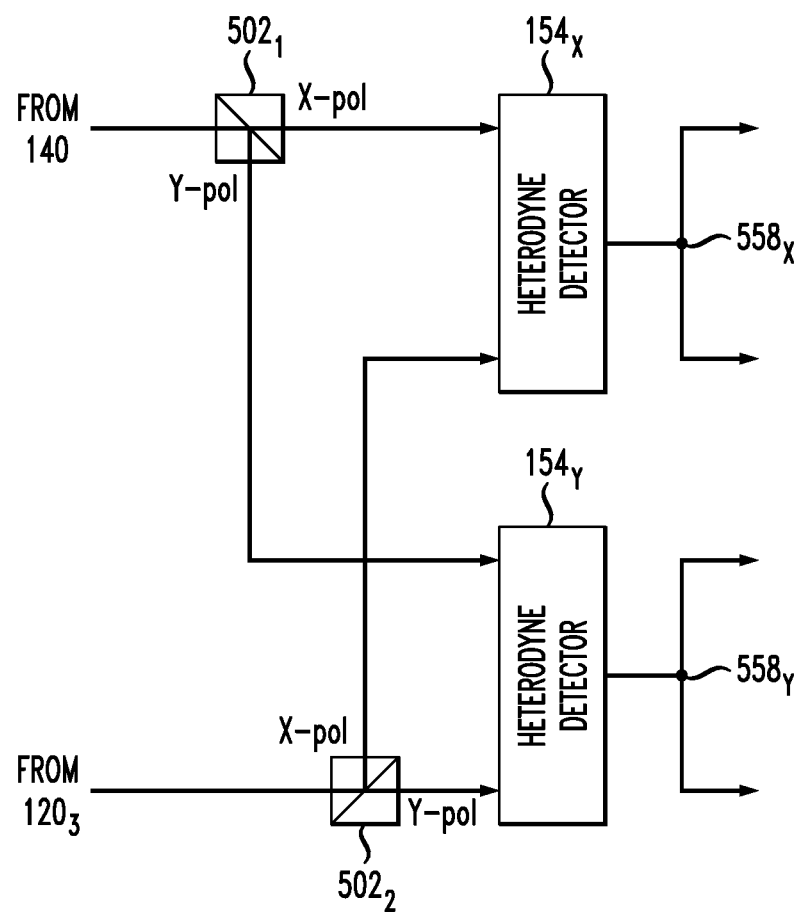
FIG. 5 shows a block diagram of an optical heterodyne detector that can be used in the optical transport system of FIG. 1 according to an embodiment of the disclosure.
Figure 6:
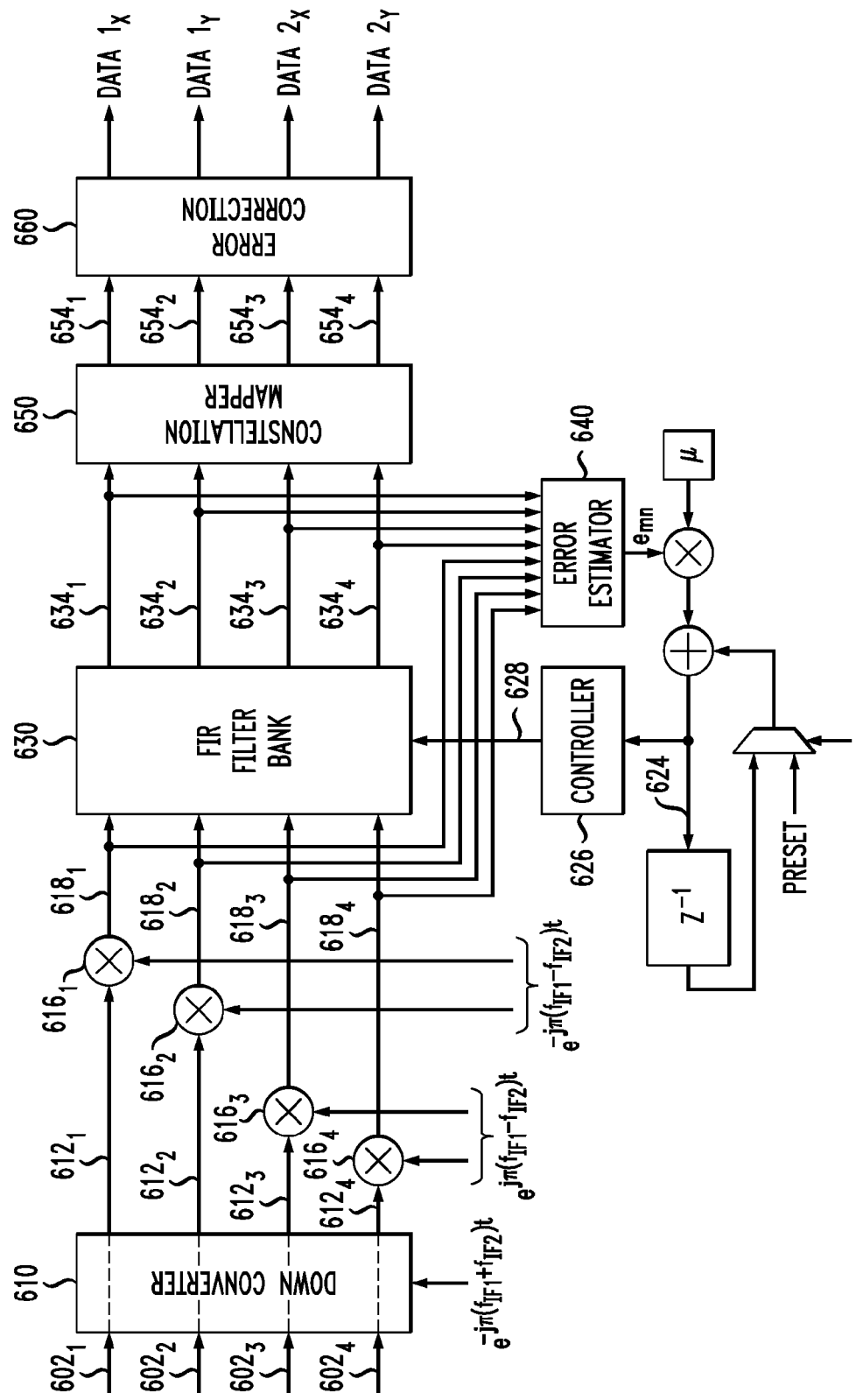
FIG. 6 shows a block diagram of a digital signal processor that can be used in the optical transport system of FIG. 1 according to an embodiment of the disclosure.
Figure 7:
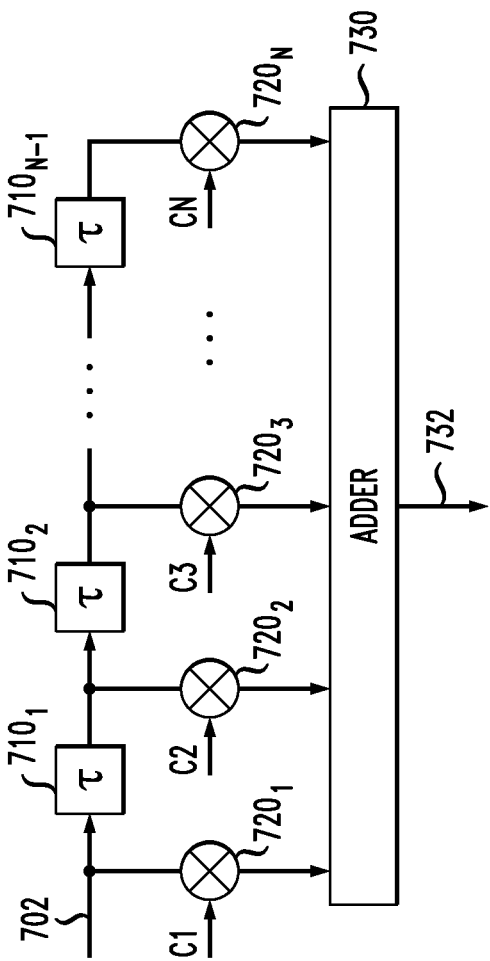
FIG. 7 shows a block diagram of a finite-impulse-response filter that can be used in the digital signal processor of FIG. 6 according to an embodiment of the disclosure.

FIGS. 4-7 show block diagrams of the various circuits/devices that can be used to modify optical transport system 100 (FIG. 1) in order to adapt it for transmission of polarization-division-multiplexed (PDM) optical signals. More specifically, FIG. 4 shows a block diagram of an optical transmitter 400 that can be used to replace each of optical transmitters 110$_1$ and 110$_2$ (FIG. 1). FIG. 5 shows a block diagram of an optical heterodyne detector 500 that can be used to replace optical heterodyne detector 154 (FIG. 1). FIG. 6 shows a block diagram of a DSP 600 that can be used to replace DSP 172 (FIG. 1). FIG. 7 shows a block diagram of a FIR filter 700 that can be used in DSP 172 (FIG. 1) or DSP 600 (FIG. 6).

FIG. 4 shows a block diagram of an optical transmitter 400 that can be used in optical transport system 100 (FIG. 1) according to an embodiment of the disclosure. Optical transmitter 400 is illustratively shown in FIG. 4 as being coupled between an electrical input port 102 and beam combiner 128 (see FIG. 1). In an example embodiment, a first instance (copy) of optical transmitter 400 can be coupled between electrical input port 102$_1$ and beam combiner 128 to replace optical transmitter 110$_1$, and a second instance of optical transmitter 400 can be coupled between electrical input port 102$_2$ and beam combiner 128 to replace optical transmitter 110$_2$ (see FIG. 1). A laser source 420 in the first instance of optical transmitter 400 is then configured to generate light having carrier frequency $f_1$, and a laser source 420 in the second instance of optical transmitter 400 is similarly configured to generate light having carrier frequency $f_2$.

Optical transmitter 400 has a DSP 412 configured to receive an input data stream from electrical input port 102. DSP 412 processes the received input data stream to generate electrical digital signals 414$_1$-414$_4$. In each signaling interval, signals 414$_1$ and 414$_2$ carry digital values that represent the I and Q components, respectively, of a corresponding constellation symbol intended for transmission using X-polarized light. Signals 414$_3$ and 414$_4$ similarly carry digital values that represent the I and Q components, respectively, of the corresponding constellation symbol intended for transmission using Y-polarized light, where the Y-polarization is approximately orthogonal to the X-polarization.

An electrical-to-optical (E/O) converter (also sometimes referred to as a front-end circuit) 416 of optical transmitter 400 transforms digital signals 414$_1$-414$_4$ into modulated optical output signal 430. More specifically, DACs 418$_1$ and 418$_2$ transform digital signals 414$_1$ and 414$_2$ into an analog form to generate drive signals $I_X$ and $Q_X$, respectively. Drive signals $I_X$ and $Q_X$ are then used, in a conventional manner, to drive an I-Q modulator 424$_X$. Based on drive signals $I_X$ and $Q_X$, I-Q modulator 424$_X$ modulates an X-polarized beam 422$_X$ of light supplied by laser source 420, thereby generating a modulated optical signal 426$_X$.

DACs 418$_3$ and 418$_4$ similarly transform digital signals 414$_3$ and 414$_4$ into an analog form to generate drive signals $I_Y$ and $Q_Y$, respectively. Based on drive signals $I_Y$ and $Q_Y$, an I-Q modulator 424$_Y$ modulates a Y-polarized beam 422$_Y$ of light supplied by laser source 420, thereby generating a modulated optical signal 426$_Y$.

A polarization beam combiner 428 combines modulated optical signals 426$_X$ and 426$_Y$ to generate optical output signal 430, which is directed to beam combiner 128 (FIG. 1).

FIG. 5 shows a block diagram of an optical heterodyne detector 500 that can be used in optical transport system 100 (FIG. 1) according to an embodiment of the disclosure. Similar to optical heterodyne detector 154 shown in FIG. 1, optical heterodyne detector 500 can be configured to receive its optical inputs from laser 120$_3$ and the egress end of fiber-optic link 140 (see FIG. 1). Each of intermediate-frequency electrical signals 558$_X$ and 558$_Y$ generated by optical heterodyne detector 500 can be filtered and digitized similar to intermediate-frequency electrical signal 158 (see FIG. 1).

Optical heterodyne detector 500 comprises two instances (copies) of optical heterodyne detector 154, which instances are labeled in FIG. 5 as 154$_X$ and 154$_Y$, respectively. Polarization beam splitters 502$_1$ and 502$_2$ operate to provide X-polarized inputs to heterodyne detector 154$_X$ and Y-polarized inputs to heterodyne detector 154$_Y$, as indicated in FIG. 5. More specifically, polarization beam splitter 502$_1$ is configured to (i) separate the X- and Y-polarizations of the modulated optical signal received from the remote optical transmitter(s), such as optical transmitters 400 (FIG. 4) or optical transmitter 900 (FIG. 9), and (ii) feed the resulting polarized optical signals into the respective signal ports of heterodyne detectors 154$_X$ and 154$_Y$. Polarization beam splitter 502$_2$ is similarly configured to (i) separate the X- and Y-polarizations of the local-oscillator signal received from laser 120$_3$ (FIG. 1) and (ii) feed the resulting polarized local-oscillator signals into the respective local-oscillator ports of heterodyne detectors 154$_X$ and 154$_Y$.

FIG. 6 shows a block diagram of a DSP 600 that can be used in optical transport system 100 (FIG. 1) according to an embodiment of the disclosure. More specifically, DSP 600 is designed to operate in conjunction with optical heterodyne detector 500 (FIG. 5) and is configured to receive (filtered intermediate-frequency) digital electrical signals 602$_1$-602$_4$. Digital electrical signals 602$_1$ and 602$_3$ correspond to the X-polarization and are generated from signal 558$_X$ (FIG. 5) in the same manner as that used in the process of generating digital electrical signals 170$_1$ and 170$_2$, respectively, from signal 158 (see FIG. 1). Digital electrical signals 602$_2$ and 602$_4$ correspond to the Y-polarization and are generated from signal 558$_Y$ (FIG. 5) also in the same manner as that used in the process of generating digital electrical signals $170_1$ and $170_2$, respectively, from signal 158.

Digital electrical signals $602_1$-$602_4$ are applied to a down-converter 610, which is configured to implement step 302 of method 300 (FIG. 3). In an example embodiment, down-converter 610 includes four complex-value multipliers (not explicitly shown in FIG. 6), each configured to multiply the respective complex-valued signal by $\exp[-j\pi(f_{IF1}+f_{IF2})t]$. The resulting complex-valued baseband signals are signals $612_1$-$612_4$.

Baseband signals $612_1$-$612_4$ are applied to multipliers $616_1$-$616_4$, which are configured to implement step 304 of method 300 (FIG. 3). More specifically, multipliers $616_1$ and $616_2$ operate to multiply baseband signals $612_1$ and $612_2$, respectively, by $\exp[-j\pi(f_{IF1}-f_{IF2})t]$. The resulting frequency-offset-corrected signals are signals $618_1$ and $618_2$, respectively. Multipliers $616_3$ and $616_4$ similarly operate to multiply baseband signals $612_3$ and $612_4$, respectively, by $\exp[j\pi(f_{IF1}-f_{IF2})t]$. The resulting frequency-offset-corrected signals are signals $618_3$ and $618_4$, respectively.

Figure 8:
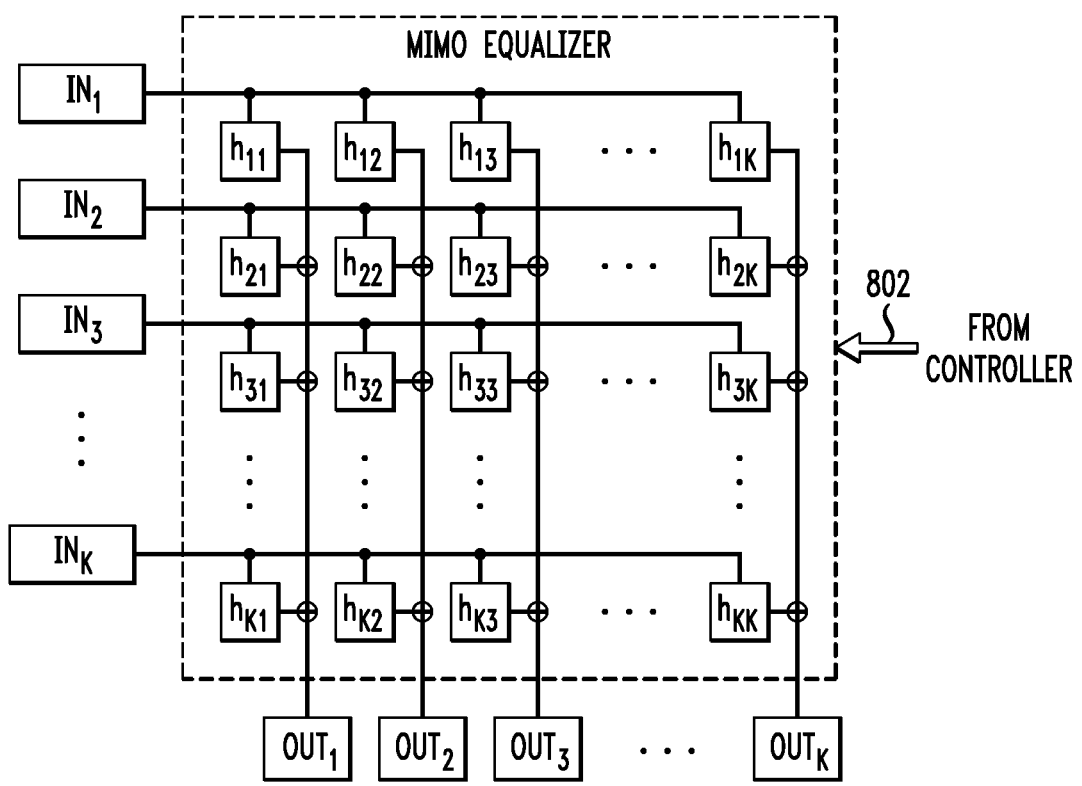
FIG. 8 shows a block diagram of a MIMO equalizer that can be used in the digital signal processor of FIG. 6 according to an embodiment of the disclosure.

Frequency-offset-corrected signals $618_1$-$618_4$ are applied to a bank 630 of configurable FIR filters (not individually shown in FIG. 6, see FIG. 7), which are configured to implement step 306 of method 300 (FIG. 3). In this particular embodiment, bank 630 has sixteen configurable FIR filters of the same length that are interconnected, e.g., as indicated in FIG. 8. The resulting equalized signals generated by filter bank 630 are signals $634_1$-$634_4$.

In an example embodiment, filter bank 630 is configured to perform signal processing that corresponds to a time-domain equivalent of Eq. (5) formulated for a four-component input and a four-component output, as expressed by Eq. (6):

$$\begin{pmatrix} x_1 \\ x_2 \\ x_3 \\ x_4 \end{pmatrix} = \begin{pmatrix} \vec{h}_{11} & \vec{h}_{12} & \vec{h}_{13} & \vec{h}_{14} \\ \vec{h}_{21} & \vec{h}_{22} & \vec{h}_{23} & \vec{h}_{24} \\ \vec{h}_{31} & \vec{h}_{32} & \vec{h}_{33} & \vec{h}_{34} \\ \vec{h}_{41} & \vec{h}_{42} & \vec{h}_{43} & \vec{h}_{44} \end{pmatrix} \begin{pmatrix} \vec{y}_1 \\ \vec{y}_2 \\ \vec{y}_3 \\ \vec{y}_4 \end{pmatrix} \quad (6)$$

where $x_1$-$x_4$ are the values of equalized signals $634_1$-$634_4$ generated by bank 630 in a single symbol period; each of vectors $\vec{h}_{mn}$ (where m=1, 2, 3, 4 and n=1, 2, 3, 4) represents a respective one of the sixteen configurable FIR filters from bank 630; and each of vectors $\vec{y}_1$-$\vec{y}_4$ represents a string of values from a respective one of frequency-offset-corrected signals $618_1$-$618_4$. Each of vectors $\vec{h}_{mn}$ and $\vec{y}_1$-$\vec{y}_4$ has N components, with N being the number of taps in the FIR filters of bank 630. More specifically, each of vectors $\vec{y}_1$-$\vec{y}_4$ consists of the values supplied during the last N symbol periods by the respective one of frequency-offset-corrected signals $618_1$-$618_4$. Each of vectors $\vec{h}_{mn}$ consists of the filter coefficients $C_1$-$C_N$ used in the respective FIR filter of bank 630 (also see FIG. 7). The values of filter coefficients $C_1$-$C_N$ can be changed over time and are set by a filter controller 626 via a control signal 628 generated based on an error-update signal 624. In operation, different FIR filters in bank 630 are typically configured to use different respective sets of coefficients $C_1$-$C_N$.

In one embodiment, error-update signal 624 is generated based on error estimates derived by an error estimator 640 from signals $618_1$-$618_4$ and $634_1$-$634_4$. Error estimator 640 is configured to generate sixteen such error estimates, each of which is then used to enable filter controller 626 to appropriately adjust coefficients $C_1$-$C_N$ of a respective one of the sixteen FIR filters in bank 630. For example, for a PDM-QPSK constellation, error estimator 640 can be configured to generate a set of error estimates $e_{mn}$ (where m=1, 2, 3, 4 and n=1, 2, 3, 4) as follows:

$$e_{mn}(k)=(1-|y_m(k)|^2)y_m(k)x_n^*(k) \quad (7)$$

where k is the counter of symbol periods; $y_m(k)$ is the value of signal $618_m$ in the k-th symbol period; $x_n(k)$ is the value of signal $634_n$ in the k-th symbol period; and the "*" symbol denotes the complex conjugate. The circuit coupled between error estimator 640 and filter controller 626 tracks average estimated errors $E_{mn}$ by recursively updating them based on error estimates $e_{mn}$ as follows:

$$E_{mn}(k)=E_{mn}(k-1)+\mu e_{mn}(k) \quad (8)$$

where $\mu$ is an error-weighting coefficient. In each symbol period, average estimated errors $E_{mn}$ are provided to filter controller 626 via error-update signal 624. Filter controller 626 then uses average estimated errors $E_{mn}$ to adaptively select coefficients $C_1$-$C_N$ for each of the sixteen FIR filters in bank 630.

Equalized signals $634_1$-$634_4$ are applied to a constellation mapper 650, which is configured to implement step 308 of method 300 (FIG. 3). In one embodiment, constellation mapper 650 may be configured to (i) calculate distances between a value supplied by equalized signal $634_n$ and the various constellation points of the operative constellation and (ii) select the nearest constellation point as an estimate of the corresponding transmitted symbol. The resulting sequences of estimated constellation symbols are sequences $654_1$-$654_4$.

Sequences $654_1$-$654_4$ are applied to an error correction module 660, where they are subjected to FEC decoding to remove possible errors (if any). After the errors are corrected, error correction module 660 generates output data streams $data1_X$, $data1_Y$, $data2_X$, and $data2_Y$, where the subscripts X and Y indicate the polarization using which the corresponding data stream was transmitted over fiber-optic link 140 (FIG. 1). Taken together, data streams $data1_X$ and $data1_Y$ have all the data of data stream data1 (see FIG. 1). Data streams $data2_X$ and $data2_Y$ similarly have all the data of data stream data2.

FIG. 7 shows a block diagram of a finite-impulse-response (FIR) filter 700 that can be used to implement any or each of the sixteen FIR filters in filter bank 630 (FIG. 6) according to an embodiment of the disclosure.

Filter 700 is configured to receive an input signal 702 and generate a filtered output signal 732. Filter 700 is an N-tap FIR filter comprising: (i) N−1 delay elements $710_1$-$710_{N-1}$; (ii) N multipliers $720_1$-$720_N$; and (iii) an adder 730. Each of delay elements $710_1$-$710_{N-1}$ is configured to introduce a time delay $\tau$, which is equal in duration to the symbol period. Each of multipliers $720_1$-$720_N$ is configured to multiply a corresponding delayed copy of input signal 702 by a respective complex-valued coefficient $C_i$, where i=1, 2, . . . , N. Adder 730 is configured to sum the output signals generated by multipliers $720_1$-$720_N$ to generate filtered output signal 732. In one embodiment, the number (N) of taps in FIR filter 700 can be between two and twelve. In an alternative embodiment, a significantly larger number of taps, e.g., about five hundred, may also be used.

FIG. 8 shows a block diagram of a MIMO equalizer 800 that can be used to implement filter bank 630 (FIG. 6) according to an embodiment of the disclosure. More specifically, an embodiment of MIMO equalizer 800 corresponding to K=4 can be configured to operate as filter bank 630 in DSP 600

(FIG. 6). In various alternative embodiments, parameter K can be selected to be any positive integer greater than one.

In operation, each of input terminals $IN_1$-$IN_K$ receives a digital input signal, such as one of signals $618_1$-$618_4$ (FIG. 6). Each of output terminals $OUT_1$-$OUT_K$ then outputs a respective output signals, such as one of signals $634_1$-$634_4$ (FIG. 6). Each of the processing blocks labeled $h_{ij}$ (where i=1, 2, ... K and j=1, 2, ... K) represents a respective FIR filter, such as filter 700 (FIG. 7). The filter coefficients $C_1$-$C_N$ for each filter $h_1$ are programmed by a corresponding controller, such as filter controller 626 (FIG. 6), via a control-signal bus 802. As indicated above, by using appropriate respective sets of filter coefficients $C_1$-$C_N$ in different filters $h_{ij}$, MIMO equalizer 800 can substantially cancel the adverse effects of inter-carrier interference, and also possibly perform some other useful operations, such as polarization de-multiplexing.

Figure 9:
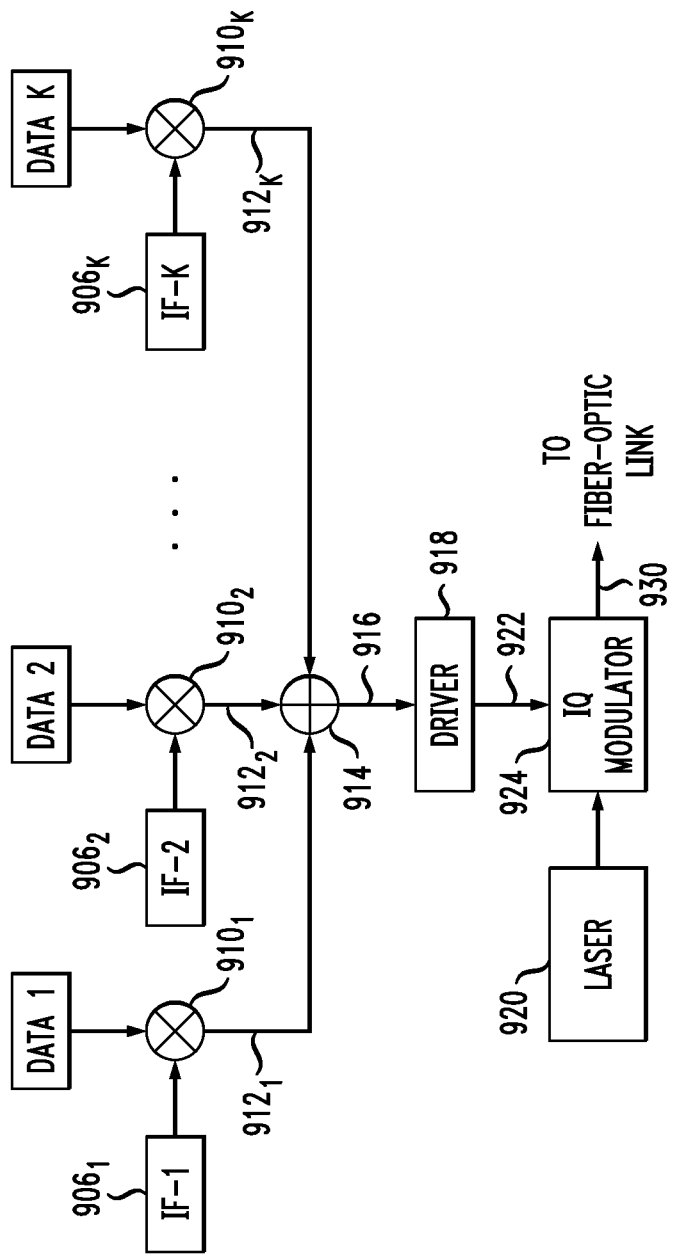
FIG. 9 shows a block diagram of an optical transmitter 900 that can be used in the optical transport system of FIG. 1 according to an alternative embodiment of the disclosure.

FIG. 9 shows a block diagram of an optical transmitter 900 that can be used in optical transport system 100 (FIG. 1) according to an alternative embodiment of the disclosure. More specifically, a modulated optical signal 930 generated by optical transmitter 900 can be applied to the ingress end of fiber-optic link 140 instead of optical signal 130 (FIG. 1). Modulated optical signal 930 has K modulated optical carriers. When received at the egress end of fiber-optic link 140, modulated optical signal 930 can be processed in the corresponding optical receiver, e.g., using a DSP that employs MIMO equalizer 800 (FIG. 8).

Optical transmitter 900 includes intermediate-frequency (IF) generators $906_1$-$906_K$, each configured to generate an electrical carrier wave having a respective intermediate frequency. The spacing between the neighboring intermediate frequencies is smaller than the baud rate R. Each electrical carrier wave generated by IF generators $906_1$-$906_K$ is then modulated, using a respective one of data streams data1-dataK, in a respective one of electrical modulators $910_1$-$910_K$. Each of the resulting modulated electrical carriers $912_1$-$912_K$ has baud rate R.

Modulated electrical carriers $912_1$-$912_K$ are combined in an electrical signal combiner 914, and a resulting modulated multi-carrier electrical signal 916 is applied to a driver circuit 918. Driver circuit 918 operates to convert modulated multi-carrier electrical signal 916 into a corresponding electrical drive signal 922 suitable for driving an I-Q modulator 924. The conversion process may include, e.g., amplifying signal 916 and applying an appropriate dc bias to the resulting amplified signal. I-Q modulator 924 operates to up-convert electrical drive signal 922 to an optical frequency range, e.g., around 190 THz, by modulating an optical carrier wave supplied by a laser source 920. The optical output signal generated by I-Q modulator 924 is optical signal 930. As already indicated above, optical signal 930 has K modulated optical carriers. The spacing between the modulated optical carriers in optical signal 930 is approximately the same as the spacing between the frequencies of the electrical carrier waves generated by IF generators $906_1$-$906_K$.

Although various embodiments have been described above in reference to optical heterodyne detection at the corresponding optical receiver (e.g., 150, FIG. 1), some embodiments can also be configured to work using optical intradyne detection, e.g., as described below in reference to FIG. 10.

Figure 10:
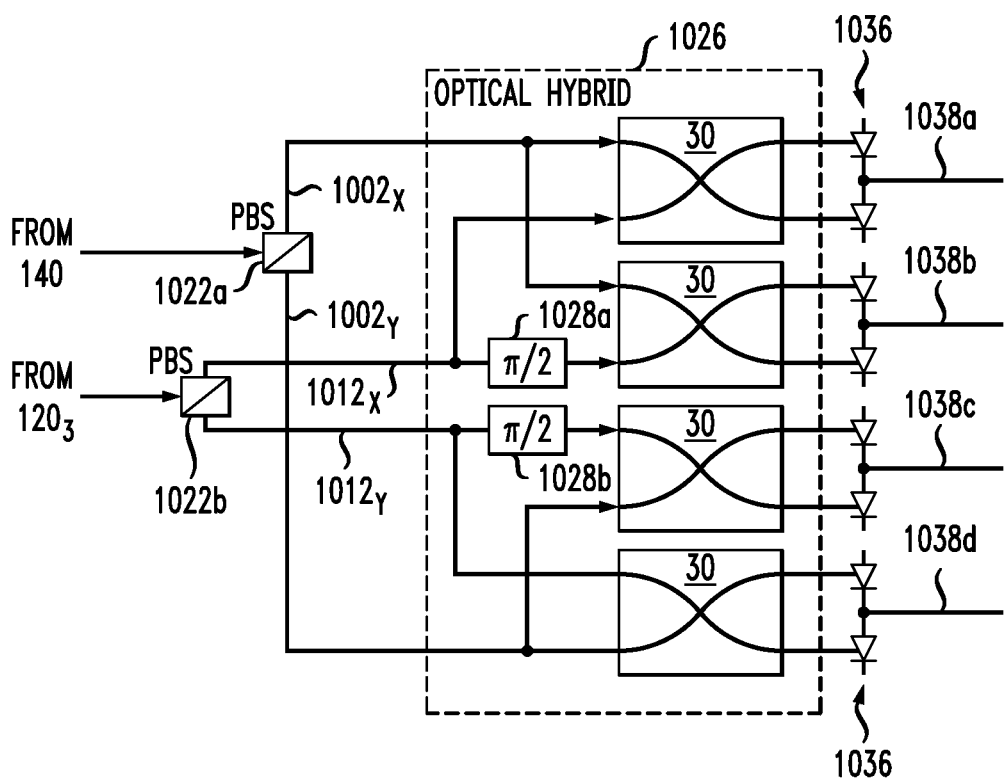
FIG. 10 shows a block diagram of an optical intradyne detector that can be used instead of the optical heterodyne detector shown in FIG. 5 according to an embodiment of the disclosure.

FIG. 10 shows a block diagram of an optical intradyne detector 1000 that can be used instead of optical heterodyne detector 500 (FIG. 5) according to an embodiment of the disclosure. Detector 1000 is configured to receive a PDM optical signal from fiber-optic link 140 (see FIG. 1) and operates to convert this PDM optical signal into four electrical signals $1038a$-$1038d$, wherein electrical signals $1038a$ and $1038b$ represent the I- and Q-components of the X-polarization of the received PDM optical signal, and electrical signals $1038c$ and $1038d$ represent the I- and Q-components of the Y-polarization of the received PDM optical signal Each of signals $1038a$-$1038d$ may then be split into two copies, and each of the copies may be subjected to filtering similar to that applied to electrical signal 158 (FIG. 1). However, one change in the filtering is that the corresponding filters now have pass-bands that are relatively close to or in the baseband, and not in the intermediate frequency range as filters 160 (FIG. 1). The resulting filtered electrical signals may be converted into digital complex values and processed in an appropriately modified embodiment of DSP 600 (FIG. 6). One of the modifications may be that down-converter 610 (FIG. 6) may be omitted or bypassed. Another modification may be that multipliers $616_1$-$616_4$ (FIG. 6) may be configured to apply other appropriate multiplication factors to perform the frequency-offset correction.

Detector 1000 implements a polarization-diversity intradyne-detection scheme using an optical local-oscillator signal that can be generated by the appropriately tuned laser source $120_3$. Polarization beam splitters (PBSs) $1022a$-$1022b$ decompose the optical input signals into respective X- and Y-polarized components, labeled $1002_X$, $1012_X$, $1002_Y$, and $1012_Y$. These polarization components are then directed to an optical hybrid 1026.

In optical hybrid 1026, each of polarization components $1002_X$, $1012_X$, $1002_Y$, and $1012_Y$ is split into two (attenuated) copies, e.g., using a conventional 3-dB power splitter (not explicitly shown in FIG. 10). A relative phase shift of about 90 degrees ($\pi/2$ radian) is then applied to one copy of component $1012_X$ and one copy of component $1012_Y$ using phase shifters $1028a$-$1028b$, respectively. The various copies of signals $1002_X$, $1012_X$, $1002_Y$, and $1012_Y$ are optically mixed with each other as shown in FIG. 10 using four optical signal mixers 30, and the mixed signals produced by the mixers are detected by eight photo-detectors (e.g., photodiodes) 1036. Photo-detectors 1036 are arranged in pairs, as shown in FIG. 10, and the output of each photo-detector pair is a corresponding one of electrical signals $1038a$-$1038d$. This configuration of photo-detectors 1036 is a differential configuration that helps to reduce noise and improve DC balancing. In an alternative embodiment, detector 1000 may have four photo-detectors 1036, one per optical signal mixer 30, configured for single-ended detection of the corresponding optical signals.

Exemplary optical hybrids that are suitable for use in detector 1000 are described, e.g., in U.S. Patent Application Publication Nos. 2007/0297806 and 2011/0038631, both of which are incorporated herein by reference in their entirety.

According to an embodiment disclosed above in reference to FIGS. 1-10, provided is an apparatus comprising an optical detector (e.g., a combination of 154, $160_1$-$160_2$, and $168_1$-$168_2$; FIG. 1) configured to generate a first filtered electrical signal (e.g., $170_1$, FIG. 1) and a second filtered electrical signal (e.g., $170_2$, FIG. 1) based on a received modulated optical signal (e.g., 142; FIG. 1). The received modulated optical signal has (i) a first modulated optical carrier (e.g., $126_1$, FIG. 1) having encoded thereon a first data stream (e.g., data1, FIG. 1) at a selected baud rate (e.g., R; Eq. (1)), said first modulated optical carrier having a first carrier frequency (e.g., $f_1$; Eq. (1)), and (ii) a second modulated optical carrier (e.g., $126_2$, FIG. 1) having encoded thereon a second data stream (e.g., data2, FIG. 1) at the selected baud rate, said second modulated optical carrier having a second carrier frequency (e.g., $f_2$; Eq. (1)), wherein the first and second carrier frequencies are separated from one another by a frequency interval that is smaller than the selected baud rate. The second filtered electrical signal is different from the first filtered electrical signal. The apparatus further comprises a signal processor (e.g., 172; FIG. 1) configured to process the first and second filtered electrical signals to recover the first data stream and the second data stream.

In some embodiments of the above apparatus, the frequency interval is smaller than about 90% of the selected baud rate.

In some embodiments of any of the above apparatus, the frequency interval is smaller than about 80% of the selected baud rate but greater than about 20% of the selected baud rate.

In some embodiments of any of the above apparatus, the optical detector comprises: a first heterodyne detector (e.g., 154; FIGS. 1 and 5) configured to convert the received modulated optical signal into a first intermediate-frequency electrical signal (e.g., 158, FIG. 1; $558_X$, FIG. 5) by mixing the received modulated optical signal with an optical local-oscillator signal (e.g., $122_3$; FIG. 1); a first band-pass filter (e.g., $160_1$; FIG. 1) configured to filter a first copy of the first intermediate-frequency electrical signal to generate the first filtered electrical signal; and a second band-pass filter (e.g., $160_2$; FIG. 1) configured to filter a second copy of the first intermediate-frequency electrical signal to generate the second filtered electrical signal.

In some embodiments of any of the above apparatus, the optical detector comprises an optical intradyne detector (e.g., 1000; FIG. 10).

In some embodiments of any of the above apparatus, the optical local-oscillator signal has a third carrier frequency (e.g., $f_3$; Eq. (2)) that is detuned from a middle of the frequency interval by at least 2R, where R is the selected baud rate.

In some embodiments of any of the above apparatus, the first band-pass filter is configured to pass a first spectral band approximately centered at a first intermediate frequency (e.g., $f_{IF1}$; Eq. (3a)); and the second band-pass filter is configured to pass a second spectral band approximately centered at a second intermediate frequency (e.g., $f_{IF2}$; Eq. (3b)) different from the first intermediate frequency.

In some embodiments of any of the above apparatus, the first intermediate frequency and the second intermediate frequency are separated from one another by a frequency interval that is smaller than the selected baud rate; and each of the first and second spectral bands has a 3-dB width of about the selected baud rate.

In some embodiments of any of the above apparatus, the optical detector further comprises: a polarization beam splitter (e.g., $502_1$; FIG. 5) configured to split the received modulated optical signal into a first (e.g., X) polarization component and a second (e.g., Y) polarization component; and a second heterodyne detector (e.g., $154_Y$; FIG. 5) configured to convert the second polarization component into a second intermediate-frequency electrical signal (e.g., $558_Y$; FIG. 5) by mixing the second polarization component with a respective (e.g., Y-pol.; FIG. 5) polarization component of the optical local-oscillator signal. The first heterodyne detector (e.g., $154_X$; FIG. 5) is configured to convert the first polarization component into the first intermediate-frequency electrical signal (e.g., $558_X$; FIG. 5).

In some embodiments of any of the above apparatus, the optical detector further comprises: a third band-pass filter (e.g., an additional copy of $160_1$; FIG. 1) configured to filter a first copy of the second intermediate-frequency electrical signal to generate a third filtered electrical signal; and a fourth band-pass filter (e.g., an additional copy of $160_2$; FIG. 1) configured to filter a second copy of the second intermediate-frequency electrical signal to generate a fourth filtered electrical signal. The signal processor (e.g., 600; FIG. 6) is further configured to process the third and fourth filtered electrical signals to recover the first data stream and the second data stream.

In some embodiments of any of the above apparatus, the signal processor comprises: an electronic circuit (e.g., 610, $616_1$-$616_4$; FIG. 6) configured to individually down-convert, by different respective frequency amounts (e.g., using steps 302-304, FIG. 3), the first filtered electrical signal and the second filtered electrical signal to generate a first electrical baseband signal (e.g., $618_1$; FIG. 6) and a second electrical baseband signal (e.g., $618_3$; FIG. 6); and a MIMO equalizer (e.g., 630, FIG. 6; 800, FIG. 8) configured to apply equalization processing (e.g., corresponding to Eqs. (5) and (6)) to the first and second electrical baseband signals to at least partially remove an effect of inter-carrier interference due to spectral overlap of the first modulated optical carrier and the second modulated optical carrier. The signal processor is configured to recover the first data stream and the second data stream based on a plurality of equalized electrical signals (e.g., $634_1$-$634_4$; FIG. 6) generated by the MIMO equalizer as a result of said equalization processing.

In some embodiments of any of the above apparatus, the MIMO equalizer comprises a plurality of configurable finite-impulse-response filters (e.g., 700, FIG. 7; $h_1$, FIG. 8). The signal processor further comprises a filter controller (e.g., 626; FIG. 6) configured to adaptively program, based on one or more error estimates, respective sets of filter coefficients (e.g., $C_1$-$C_N$; FIG. 7) used to configure different filters of said plurality of configurable finite-impulse-response filters, with said one or more error estimates being generated (e.g., as expressed by Eqs. (7)-(8)) based on the first and second electrical baseband signals and the plurality of equalized electrical signals.

In some embodiments of any of the above apparatus, the received modulated optical signal further has one or more additional modulated optical carriers (e.g., generated by 900; FIG. 9) having encoded thereon one or more respective additional data streams (e.g., . . . dataK, FIG. 9) at the selected baud rate; a respective carrier frequency of each of said one or more additional modulated optical carriers is separated from a carrier frequency of a nearest (in terms of the frequency) modulated optical carrier in the received modulated optical by a respective frequency interval that is smaller than the selected baud rate; the optical detector is further configured to generate one or more additional filtered electrical signals (e.g., corresponding to $IN_1$-$IN_K$, FIG. 8) based on the received modulated optical signal; and the signal processor is further configured to process said one or more additional filtered electrical signals together with the first and second filtered electrical signals to recover the one or more respective additional data streams.

In some embodiments of any of the above apparatus, the apparatus further comprises an optical transmitter (e.g., 900, FIG. 9) optically coupled to the optical detector via a fiber-optic link (e.g., 140, FIG. 1) and configured to apply the received modulated optical signal to the optical detector.

In some embodiments of any of the above apparatus, the fiber-optic link (e.g., 140, FIG. 1) comprises a single-mode fiber or a multimode fiber.

In some embodiments of any of the above apparatus, the apparatus further comprises at least a portion of the fiber-optic link (e.g., 140, FIG. 1).

In some embodiments of any of the above apparatus, the optical transmitter comprises: a plurality of electrical intermediate-frequency generators (e.g., $906_1$-$906_K$, FIG. 9), each configured to generate a respective electrical carrier wave having a respective intermediate frequency, wherein spacing between neighboring intermediate frequencies is smaller than the selected baud rate; a plurality of electrical modulators (e.g., $910_1$-$910_K$; FIG. 9), each configured to modulate the respective electrical carrier wave using a respective one of the first data stream, the second data stream, and the one or more additional data streams to generate a respective one of a plurality of modulated electrical carriers (e.g., $912_1$-$912_K$; FIG. 9); an electrical signal combiner (e.g., 914; FIG. 9) configured to combine the plurality of modulated electrical carriers to generate a modulated multi-carrier electrical signal (e.g., 916; FIG. 9); and an optical modulator (e.g., 924; FIG. 9) configured to generate the received modulated optical signal by modulating an optical carrier wave based on the modulated multi-carrier electrical signal.

In some embodiments of any of the above apparatus, the signal processor further comprises: a constellation mapper (e.g., 650; FIG. 6) configured to convert each of the plurality of equalized electrical signals into a respective sequence (e.g., $654_1$-$654_4$; FIG. 6) of estimated constellation symbols; and an error correction module (e.g., 660; FIG. 6) configured to apply error-correction processing to the sequences of estimated constellation symbols generated by the constellation mapper to recover the first data stream and the second data stream.

In some embodiments of any of the above apparatus, the apparatus further comprises one or more optical transmitters (e.g., $110_1$-$110_2$, FIG. 1; 400, FIG. 4; 900, FIG. 9) optically coupled to the optical detector via a fiber-optic link (e.g., 140, FIG. 1) and configured to apply the received modulated optical signal to the optical detector.

In some embodiments of any of the above apparatus, the one or more optical transmitters include: a first optical transmitter (e.g., $110_1$, FIG. 1) configured to generate the first modulated optical carrier; and a second optical transmitter (e.g., $110_2$, FIG. 1) configured to generate the second modulated optical carrier. The apparatus further comprises an optical combiner (e.g., 128; FIG. 1) configured to combine the first and second modulated optical carriers to generate the received modulated optical signal.

In some embodiments of any of the above apparatus, the one or more optical transmitters include: a plurality of electrical intermediate-frequency generators (e.g., $906_1$-$906_K$, FIG. 9), each configured to generate a respective electrical carrier wave having a respective intermediate frequency, wherein spacing between neighboring intermediate frequencies is smaller than the selected baud rate; a plurality of electrical modulators (e.g., $910_1$-$910_K$; FIG. 9), each configured to modulate the respective electrical carrier wave using a respective one of the first data stream, the second data stream, and one or more additional data streams to generate a respective one of a plurality of modulated electrical carriers (e.g., $912_1$-$912_K$; FIG. 9); an electrical signal combiner (e.g., 914; FIG. 9) configured to combine the plurality of modulated electrical carriers to generate a modulated multi-carrier electrical signal (e.g., 916; FIG. 9); and an optical modulator (e.g., 924; FIG. 9) configured to generate the received modulated optical signal by modulating an optical carrier wave based on the modulated multi-carrier electrical signal.

According to another embodiment disclosed above in reference to FIGS. 1-10, provided is an apparatus comprising: a first optical transmitter (e.g., $110_1$, FIG. 1) configured to generate a first modulated optical carrier (e.g., $126_1$, FIG. 1) having encoded thereon a first data stream (e.g., data1, FIG. 1) at a selected baud rate (e.g., R; Eq. (1)), said first modulated optical carrier having a first carrier frequency (e.g., $f_1$; Eq. (1)); a second optical transmitter (e.g., $110_2$, FIG. 1) configured to generate a second modulated optical carrier (e.g., $126_2$, FIG. 1) having encoded thereon a second data stream (e.g., data2, FIG. 1) at the selected baud rate, said second modulated optical carrier having a second carrier frequency (e.g., $f_2$; Eq. (1)), wherein the first and second carrier frequencies are separated from one another by a frequency interval that is smaller than the selected baud rate; and an optical combiner (e.g., 128; FIG. 1) configured to combine the first modulated optical carrier and the second modulated optical carrier for transmission over a fiber-optic link (e.g., 140; FIG. 1).

In some embodiments of the above apparatus, the frequency interval is smaller than about 90% of the selected baud rate.

In some embodiments of any of the above apparatus, the frequency interval is smaller than about 80% of the selected baud rate but greater than about 20% of the selected baud rate.

In some embodiments of any of the above apparatus, the first data stream comprises a first sub-stream (e.g., data$1_X$; FIG. 6) and a second sub-stream (e.g., data$1_Y$; FIG. 6); and the first optical transmitter (e.g., 400; FIG. 4) is configured to encode the first sub-stream onto a first (e.g., X) polarization of the first modulated optical carrier and encode the second sub-stream onto a second (e.g., Y) polarization of the first modulated optical carrier, said second polarization being approximately (e.g., within 10 degrees) orthogonal to the first polarization.

According to yet another embodiment disclosed above in reference to FIGS. 1-10, provided is an apparatus comprising: a plurality of electrical intermediate-frequency generators (e.g., $906_1$-$906_K$, FIG. 9), each configured to generate a respective electrical carrier wave having a respective intermediate frequency, wherein spacing between neighboring intermediate frequencies is smaller than a selected baud rate (e.g., R; Eq. (1)); a plurality of electrical modulators (e.g., $910_1$-$910_K$; FIG. 9), each configured to modulate the respective electrical carrier wave, at the selected baud rate and using a respective one of a plurality of data streams (e.g., data1-dataK; FIG. 9) to generate a respective one of a plurality of modulated electrical carriers (e.g., $912_1$-$912_K$; FIG. 9); an electrical signal combiner (e.g., 914; FIG. 9) configured to combine the plurality of modulated electrical carriers to generate a modulated multi-carrier electrical signal (e.g., 916; FIG. 9); and an optical modulator (e.g., 924; FIG. 9) configured to generate a modulated optical signal (e.g., 930; FIG. 9) by modulating an optical carrier wave based on the modulated multi-carrier electrical signal.

In some embodiments, the FD-MIMO processing described above can be adapted for transmission format that exhibit relatively strong inter-carrier interference when the relationship between the carrier frequencies of the two modulated optical carriers used in optical transport system 100 is described by Eq. (9):

$$R < |f_1 - f_2| < 5R \quad (9)$$

A corresponding embodiment provides an apparatus comprising an optical detector (e.g., a combination of 154, $160_1$-$160_2$, and $168_1$-$168_2$; FIG. 1; 500 and the corresponding filters configured to filter signals $558_X$ and $558_Y$, FIG. 5; or 1000 and the corresponding filters configured to filter signals 1038a-1038d, FIG. 10) configured to generate a first filtered electrical signal and a second filtered electrical signal based on a received modulated optical signal, wherein the received modulated optical signal has (i) a first modulated optical carrier having encoded thereon a first data stream at a selected baud rate, said first modulated optical carrier having a first carrier frequency, and (ii) a second modulated optical carrier having encoded thereon a second data stream at the selected baud rate, said second modulated optical carrier having a second carrier frequency. The apparatus further comprises a signal processor (e.g., 600, FIG. 6) configured to: (i) convert the first filtered electrical signal into a first electrical baseband signal; (ii) convert the second filtered electrical signal into a second electrical baseband signal; (iii) apply MIMO equalization processing (e.g., using 630, FIG. 6) to the first and second electrical baseband signals to mitigate an effect of inter-carrier interference due to partial spectral overlap of the first modulated optical carrier and the second modulated optical carrier, said MIMO equalization processing configured to receive, as a first input, the first electrical baseband signal (e.g., one of 618, FIG. 6), and further configured to receive, as a second input, the second electrical baseband signal (e.g., another one of 618, FIG. 6), wherein said MIMO equalization processing is configured to generate a first equalized electrical signal (e.g., one of 634, FIG. 6), as a first output thereof, and a second equalized electrical signal (e.g., another one of 634, FIG. 6), as a second output thereof; (iv) recover the first data stream based on the first equalized electrical signal; and (v) recover the second data stream based on the second equalized electrical signal.

In some embodiments of the above apparatus, the signal processor comprises a plurality of configurable finite-impulse-response filters (e.g., 700, FIG. 7; 800, FIG. 8). The signal processor further comprises an electronic filter controller (e.g., 626, FIG. 6) configured to adaptively program, based on one or more error estimates, respective sets of filter coefficients used to configure different filters of said plurality of configurable finite-impulse-response filters, with said one or more error estimates being generated based on the first and second electrical baseband signals and the first and second equalized electrical signals.

In some embodiments of any of the above apparatus, the first and second carrier frequencies are separated from one another by a frequency interval that is greater than the selected baud rate.

In some embodiments of any of the above apparatus, the first and second carrier frequencies are separated from one another by a frequency interval that is smaller than 3R, where R is the selected baud rate.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors" and "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
a first heterodyne detector configured to convert a received modulated optical signal into a first intermediate-frequency electrical signal by mixing the received modulated optical signal with an optical local-oscillator signal, the received modulated optical signal having (i) a first modulated optical carrier having encoded thereon a first data stream at a selected baud rate, said first modulated optical carrier having a first carrier frequency, and (ii) a second modulated optical carrier having encoded thereon a second data stream at the selected baud rate, said second modulated optical carrier having a second carrier frequency different from the first carrier frequency;
a first band-pass filter configured to generate a first filtered electrical signal by passing a first spectral band of the first intermediate-frequency electrical signal, said first spectral band being approximately centered at a first intermediate frequency;
a second band-pass filter configured to generate a second filtered electrical signal by passing a second spectral band of the first intermediate-frequency electrical signal, said second spectral band being approximately centered at a second intermediate frequency different from the first intermediate frequency such that an absolute value of a frequency difference between the first and second intermediate frequencies is smaller than the selected baud rate; and
an electronic MIMO equalizer configured to generate a plurality of equalized electrical signals by applying equalization processing to a first digital baseband signal corresponding to the first filtered electrical signal and to a second digital baseband signal corresponding to the second filtered electrical signal; and
wherein the apparatus is a signal processor configured to process the first and second filtered electrical signals to recover the first data stream and the second data stream based on the plurality of equalized electrical signals.

2. The apparatus of claim 1, wherein the frequency difference is smaller than about 90% of the selected baud rate but greater than about 10% of the selected baud rate.

3. The apparatus of claim 1, wherein the optical local-oscillator signal has a third carrier frequency that is detuned from a middle of a frequency interval between the first and second carrier frequencies by at least 2R, where R is the selected baud rate.

4. The apparatus of claim 1, wherein:
the first carrier frequency and the second carrier frequency differ from one another by the frequency difference; and
the first and second band-pass filters are configured to shape the first and second spectral bands, respectively, such that each of the first and second spectral bands has a 3-dB width of about the selected baud rate.

5. The apparatus of claim 1, further comprising:
a polarization beam splitter configured to split the received modulated optical signal into a first polarization component and a second polarization component; and
a second heterodyne detector configured to convert the second polarization component into a second intermediate-frequency electrical signal by mixing the second polarization component with a respective polarization component of the optical local-oscillator signal; and
wherein the first heterodyne detector is configured to convert the first polarization component into the first intermediate-frequency electrical signal.

6. The apparatus of claim 5, further comprising:
a third band-pass filter configured to generate a third filtered electrical signal by passing a first spectral band of the second intermediate-frequency electrical signal; and
a fourth band-pass filter configured to generate a fourth filtered electrical signal by passing a second spectral band of the second intermediate-frequency electrical signal; and
wherein the electronic MIMO equalizer is further configured to generate the plurality of equalized electrical signals by applying equalization processing to a third digital baseband signal corresponding to the third filtered electrical signal and to a fourth digital baseband signal corresponding to the fourth filtered electrical signal; and
wherein the apparatus is further configured to process the third and fourth filtered electrical signals to recover the first data stream and the second data stream.

7. The apparatus of claim 1, further comprising:
an electronic circuit configured to individually down-convert, by different respective frequency amounts, the first filtered electrical signal and the second filtered electrical signal to generate the first digital baseband signal and the second digital baseband signal.

8. The apparatus of claim 7,
wherein the electronic MIMO equalizer comprises a plurality of configurable finite-impulse-response filters; and
wherein the apparatus further comprises a filter controller configured to adaptively program, based on one or more error estimates, respective sets of filter coefficients used to configure different filters of said plurality of configurable finite-impulse-response filters, with said one or more error estimates being generated based on the first and second digital baseband signals and the plurality of equalized electrical signals.

9. The apparatus of claim 7, wherein:
the received modulated optical signal further has one or more additional modulated optical carriers having encoded thereon one or more respective additional data streams at the selected baud rate;
a respective carrier frequency of each of said one or more additional modulated optical carriers is separated from a carrier frequency of a nearest modulated optical carrier in the received modulated optical by a respective frequency interval that is smaller than the selected baud rate;
the apparatus further comprises one or more additional band-pass filters configured to generate one or more additional filtered electrical signals by passing one or more additional spectral bands of the first intermediate-frequency electrical signal; and
the apparatus is further configured to process said one or more additional filtered electrical signals together with the first and second filtered electrical signals to recover the one or more respective additional data streams.

10. The apparatus of claim 9, further comprising an optical transmitter optically coupled to the first heterodyne detector via a fiber-optic link and configured to apply the received modulated optical signal to the first heterodyne detector.

11. The apparatus of claim 10, wherein the optical transmitter comprises:
a plurality of electrical intermediate-frequency generators, each configured to generate a respective electrical carrier wave having a respective intermediate frequency, wherein spacing between neighboring intermediate frequencies is smaller than the selected baud rate;

a plurality of electrical modulators, each configured to modulate the respective electrical carrier wave using a respective one of the first data stream, the second data stream, and the one or more additional data streams to generate a respective one of a plurality of modulated electrical carriers;

an electrical signal combiner configured to combine the plurality of modulated electrical carriers to generate a modulated multi-carrier electrical signal; and an optical modulator configured to generate the received modulated optical signal by modulating an optical carrier wave using the modulated multi-carrier electrical signal.

12. The apparatus of claim 7, further comprising:
a constellation mapper configured to convert each of the plurality of equalized electrical signals into a respective sequence of estimated constellation symbols; and
an error correction module configured to apply error-correction processing to the sequences of estimated constellation symbols generated by the constellation mapper to recover the first data stream and the second data stream.

13. The apparatus of claim 1, further comprising one or more optical transmitters optically coupled to the first heterodyne detector via a fiber-optic link and configured to apply the received modulated optical signal to the first heterodyne detector.

14. The apparatus of claim 13,
wherein the one or more optical transmitters include:
a first optical transmitter configured to generate the first modulated optical carrier; and
a second optical transmitter configured to generate the second modulated optical carrier; and
wherein the apparatus further comprises an optical combiner configured to combine the first and second modulated optical carriers to generate the received modulated optical signal.

15. The apparatus of claim 13, wherein the one or more optical transmitters include:
a plurality of electrical intermediate-frequency generators, each configured to generate a respective electrical carrier wave having a respective intermediate frequency, wherein spacing between neighboring intermediate frequencies is smaller than the selected baud rate;
a plurality of electrical modulators, each configured to modulate the respective electrical carrier wave using a respective one of the first data stream, the second data stream, and one or more additional data streams to generate a respective one of a plurality of modulated electrical carriers;
an electrical signal combiner configured to combine the plurality of modulated electrical carriers to generate a modulated multi-carrier electrical signal; and
an optical modulator configured to generate the received modulated optical signal by modulating an optical carrier wave using the modulated multi-carrier electrical signal.

16. An apparatus comprising:
a first optical transmitter configured to generate a first modulated optical carrier having encoded thereon a first data stream at a selected baud rate, said first modulated optical carrier having a first carrier frequency;
a second optical transmitter configured to generate a second modulated optical carrier having encoded thereon a second data stream at the selected baud rate, said second modulated optical carrier having a second carrier frequency, wherein the first and second carrier frequencies are separated from one another by a frequency interval that is smaller than the selected baud rate; and
an optical combiner configured to combine the first modulated optical carrier and the second modulated optical carrier for transmission over a fiber-optic link.

17. The apparatus of claim 16, wherein:
the first data stream comprises a first sub-stream and a second sub-stream; and
the first optical transmitter is configured to encode the first sub-stream onto a first polarization of the first modulated optical carrier and encode the second sub-stream onto a second polarization of the first modulated optical carrier, said second polarization being approximately orthogonal to the first polarization.

18. An apparatus comprising:
a plurality of electrical intermediate-frequency generators, each configured to generate a respective electrical carrier wave having a respective intermediate frequency, wherein spacing between neighboring intermediate frequencies is smaller than a selected baud rate;
a plurality of electrical modulators, each configured to modulate the respective electrical carrier wave, at the selected baud rate and using a respective one of a plurality of data streams to generate a respective one of a plurality of modulated electrical carriers;
an electrical signal combiner configured to combine the plurality of modulated electrical carriers to generate a modulated multi-carrier electrical signal; and
an optical modulator configured to generate a modulated optical signal by modulating an optical carrier wave based on the modulated multi-carrier electrical signal.

19. An apparatus comprising:
an optical detector configured to generate a first filtered electrical signal and a second filtered electrical signal based on a received modulated optical signal, wherein the received modulated optical signal has (i) a first modulated optical carrier having encoded thereon a first data stream at a selected baud rate, said first modulated optical carrier having a first carrier frequency, and (ii) a second modulated optical carrier having encoded thereon a second data stream at the selected baud rate, said second modulated optical carrier having a second carrier frequency; and
a signal processor configured to:
convert the first filtered electrical signal into a first electrical baseband signal;
convert the second filtered electrical signal into a second electrical baseband signal;
apply MIMO equalization processing to the first and second electrical baseband signals to mitigate an effect of inter-carrier interference due to partial spectral overlap of the first modulated optical carrier and the second modulated optical carrier, said MIMO equalization processing configured to receive, as a first input, the first electrical baseband signal, and further configured to receive, as a second input, the second electrical baseband signal, wherein said MIMO equalization processing is configured to generate a first equalized electrical signal, as a first output thereof, and a second equalized electrical signal, as a second output thereof;
recover the first data stream based on the first equalized electrical signal; and
recover the second data stream based on the second equalized electrical signal.

20. The apparatus of claim 19,
wherein the signal processor comprises a plurality of configurable finite-impulse-response filters; and
wherein the signal processor further comprises an electronic filter controller configured to adaptively program, based on one or more error estimates, respective sets of filter coefficients used to configure different filters of said plurality of configurable finite-impulse-response filters, with said one or more error estimates being generated based on the first and second electrical baseband signals and the first and second equalized electrical signals.

21. The apparatus of claim 19, wherein the first and second carrier frequencies are separated from one another by a frequency interval that is greater than the selected baud rate.

22. The apparatus of claim 21, wherein the first and second carrier frequencies are separated from one another by a frequency interval that is smaller than 3R, where R is the selected baud rate.

* * * * *

UNITED STATES PATENT AND TRADEMARK OFFICE
CERTIFICATE OF CORRECTION

PATENT NO.       : 9,148,247 B2
APPLICATION NO.  : 14/032419
DATED            : September 29, 2015
INVENTOR(S)      : Kaneda Page 1 of 1

It is certified that error appears in the above-identified patent and that said Letters Patent is hereby corrected as shown below:

In the claims

Column 19, line 40, Claim 1, delete "a signal processor"

Column 19, line 41, Claim 1, delete "process the first and the second filtered electrical signals to"

Signed and Sealed this
Twenty-first Day of June, 2016

Michelle K. Lee
*Director of the United States Patent and Trademark Office*